Feb. 3, 1931.    A. SUNDH    1,791,016
FLEXIBLE SHOCK ABSORBING FRICTION CLUTCH
Filed Dec. 3, 1927    4 Sheets-Sheet 1

Feb. 3, 1931. A. SUNDH 1,791,016
FLEXIBLE SHOCK ABSORBING FRICTION CLUTCH
Filed Dec. 3, 1927 4 Sheets-Sheet 4
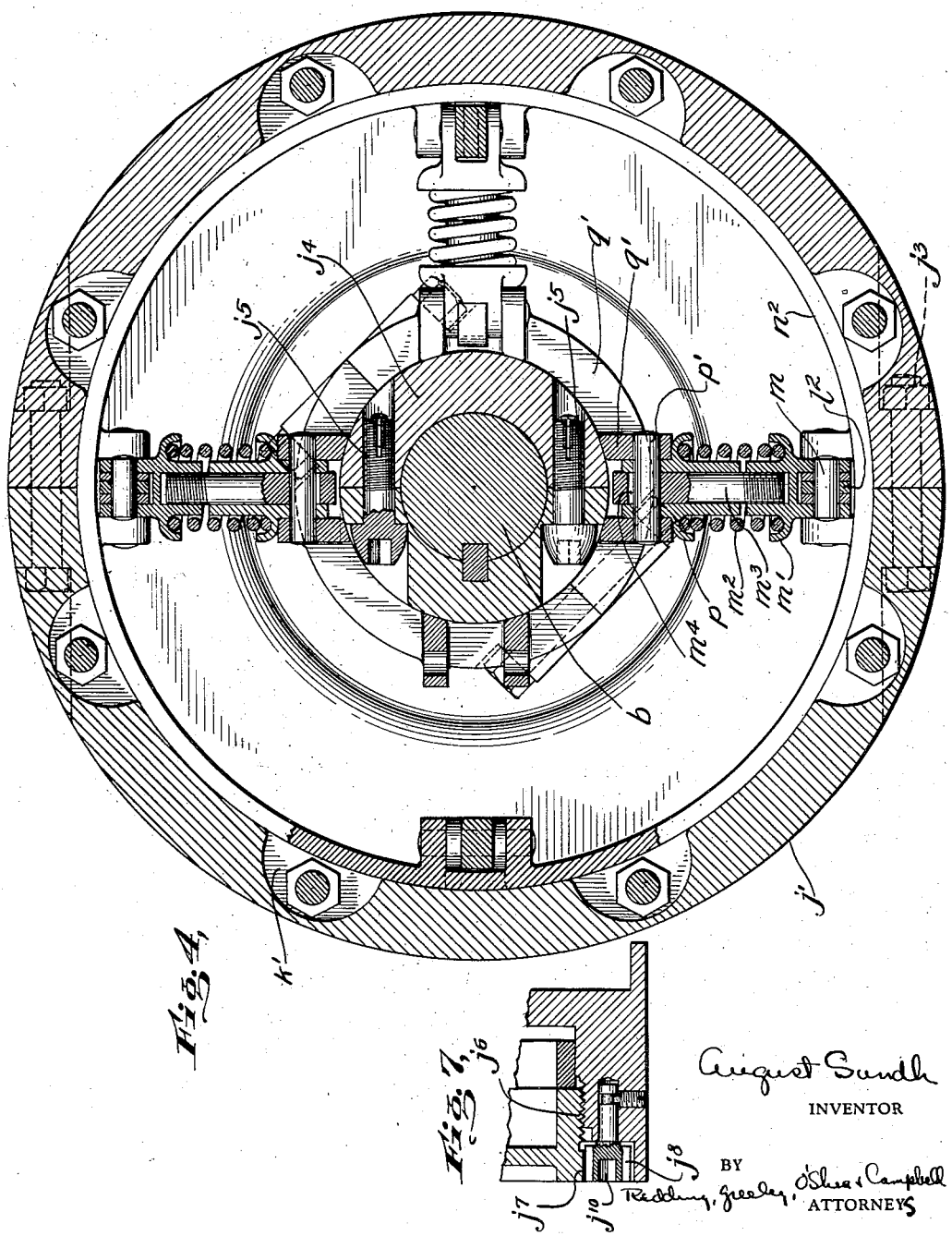

Patented Feb. 3, 1931

1,791,016

UNITED STATES PATENT OFFICE

AUGUST SUNDH, OF HASTINGS UPON HUDSON, NEW YORK

FLEXIBLE SHOCK-ABSORBING FRICTION CLUTCH

Application filed December 3, 1927. Serial No. 237,367.

This invention relates generally to improvements in clutches and has as its broad objects to provide a clutch which shall be of simple construction, compact, easy of assembly, accessible for repair or adjustment and of such construction as to afford compensation for misalignment of the driving and driven shafts, permit relative axial movements between the driving and driven shafts, and relieve the clutch elements of destructive shocks and stresses.

It has been the general practice heretofore to attempt true alignment of the driving and driven shafts when connecting them with a clutch. To secure such a condition involves extensive labor, great care and substantial expense and even when approximated at the time of installation, the alignment is often disturbed in use by the inevitable influences incident to hard service, such as wear, settling, overloading and shocks, to name but a few. In accordance with the present invention it is proposed to eliminate the necessity of securing or maintaining accurate alignment of the shafts by providing a clutch whose parts are self-aligning under all conditions of use, the driving and driven members of the clutch being operated efficiently, even when sliding out of line to compensate for misalignment of the respective shafts with which they are connected. In other words, the improved clutch has incorporated therein, elements which of themselves comprise flexible couplings between the two shafts.

In known clutches, it has not been the practice to provide for relative axial movement between the shafts. This has imposed distinct limitations on the widest usefulness of clutches, especially where, for instance, the armature of an electric motor has been the driving source. In such a case and many others, it is advisable to afford capacity for relative axial movements of the shafts and this has been accomplished in the improved clutch by providing and so relating the elements thereof as to afford a degree of floating movement without interference with efficient operation.

Another objection to known clutches is that no inherent provision against over-stresses and shocks on the friction elements has been made. In many services, such shocks and over-tresses are inevitable and cause such damage and wear as to require frequent replacement. In the improved clutch, however, a degree of adjustment is provided which will permit the exact predetermination of critical loads and shocks at which the friction elements will free themselves sufficiently to avoid undue wear or injury. By such a yielding adjustment, the clutch elements are permitted to slip under loads and shocks in excess of the predetermined maximum for which the adjustment is made, the elements performing their intended function efficiently at all loads below this predetermined maximum.

The improved clutch, in addition to all of the characteristics hereinbefore pointed out briefly, has many other advantages, among which may be noted complete enclosure against dust and corresponding protection against flying parts from within and adequate lubrication.

These and other objects of the invention will appear more fully in connection with the detailed description of the embodiment illustrated by way of example in the accompanying drawings wherein:

Fig. 4 is a view in transverse section taken on the plane indicated by line 4—4 of Fig. 1 and looking in the direction of the arrows.

Fig. 5 is a detail, sectional view showing the positioning springs for one of the clutch members and taken on the plane indicated by line 5—5 of Fig. 3.

Fig. 6 is a detail, sectional view showing one of the operating toggles for the presser plate and taken on the plane indicated by line 6—6 of Fig. 1 and looking in the direction of the arrows.

Fig. 7 is a fragmentary detail view in section showing the adjusting mechanism for the spring tension and taken on the plane indicated by line 7—7 of Fig. 2 and looking in the direction of the arrows.

It will be understood as this description proceeds that the features of improvement will lend themselves to incorporation in clutches differing in details of design from that illustrated herein and further that no limitation as to the size, shape or materials is intended to be impressed on the claims by reason of the illustrated embodiment so long as the parts function to accomplish the general objects sought. Further, it will be evident that it is immaterial as to which element is considered the driving part and which the driven part, although for convenience in this description one member will be assumed to be the driving part and the other to be the driven part.

Figure 1:
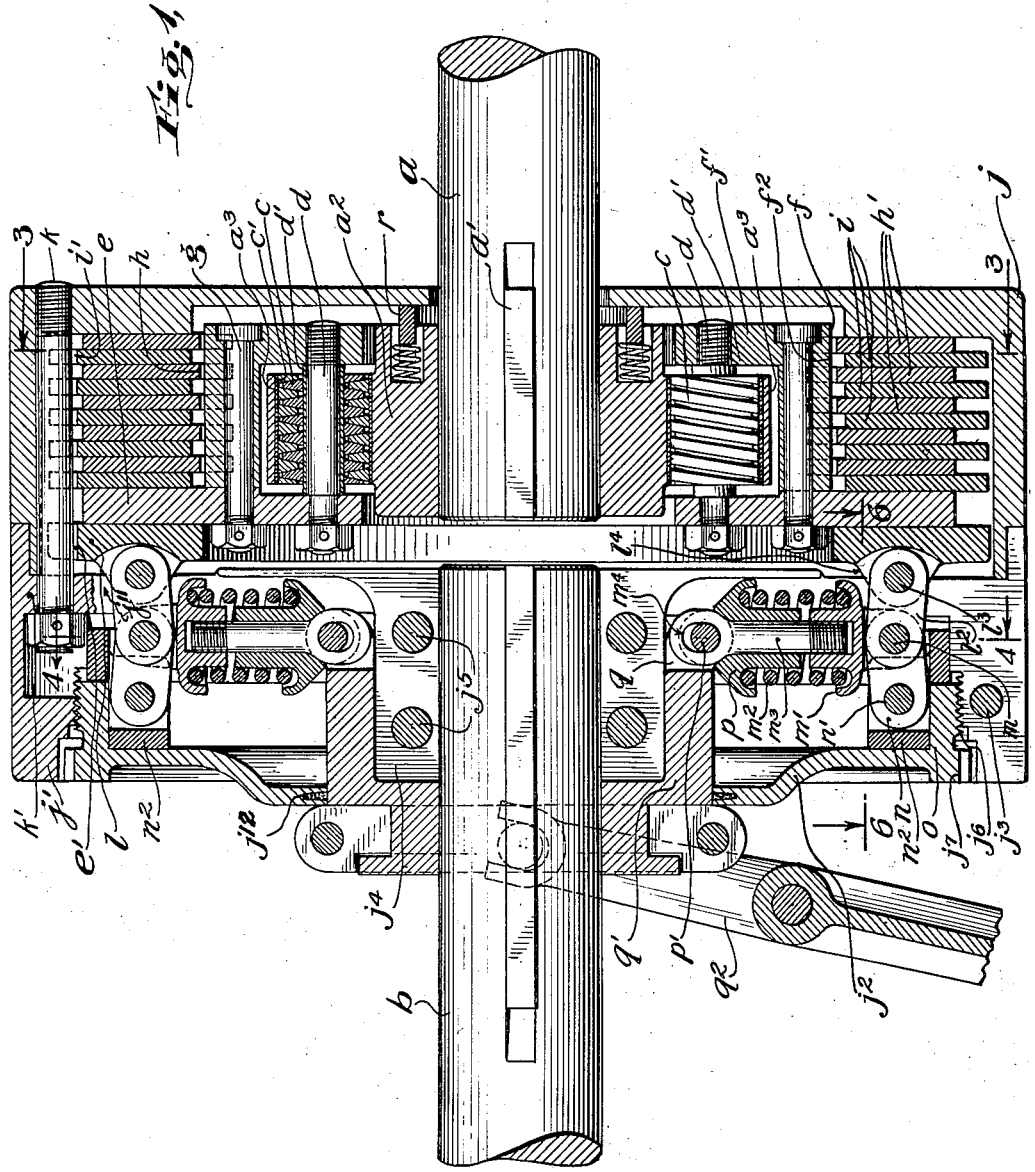
Fig. 1 is a view in section through the improved clutch showing the relationship between the driving and driven members and taken on the planes indicated by the broken lines 1—1 of Fig. 3, and looking in the direction of the arrows.
Figure 2:
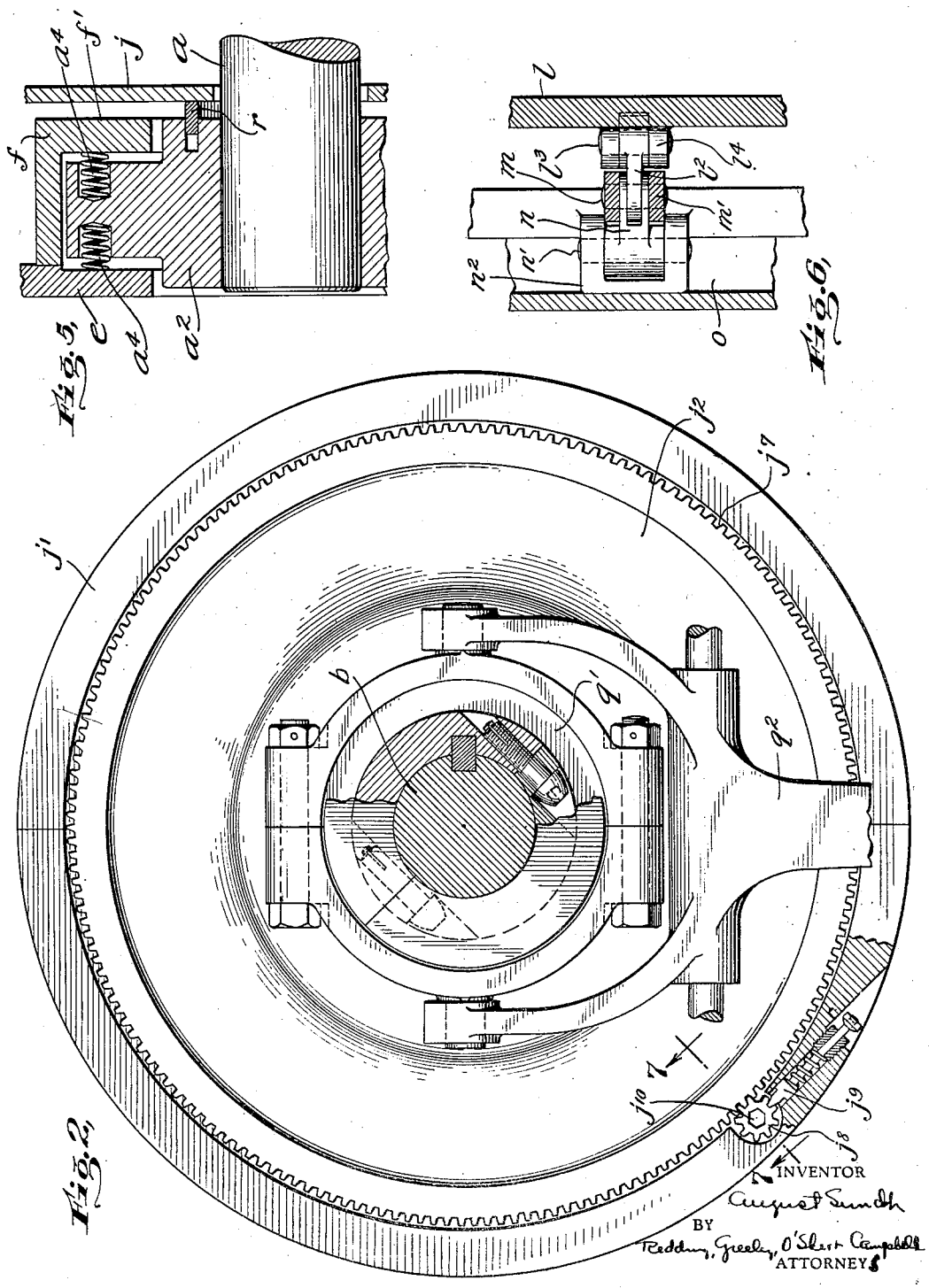
Fig. 2 is a view partly in end elevation and partly in section showing the adjustment for spring tension.
Figure 3:
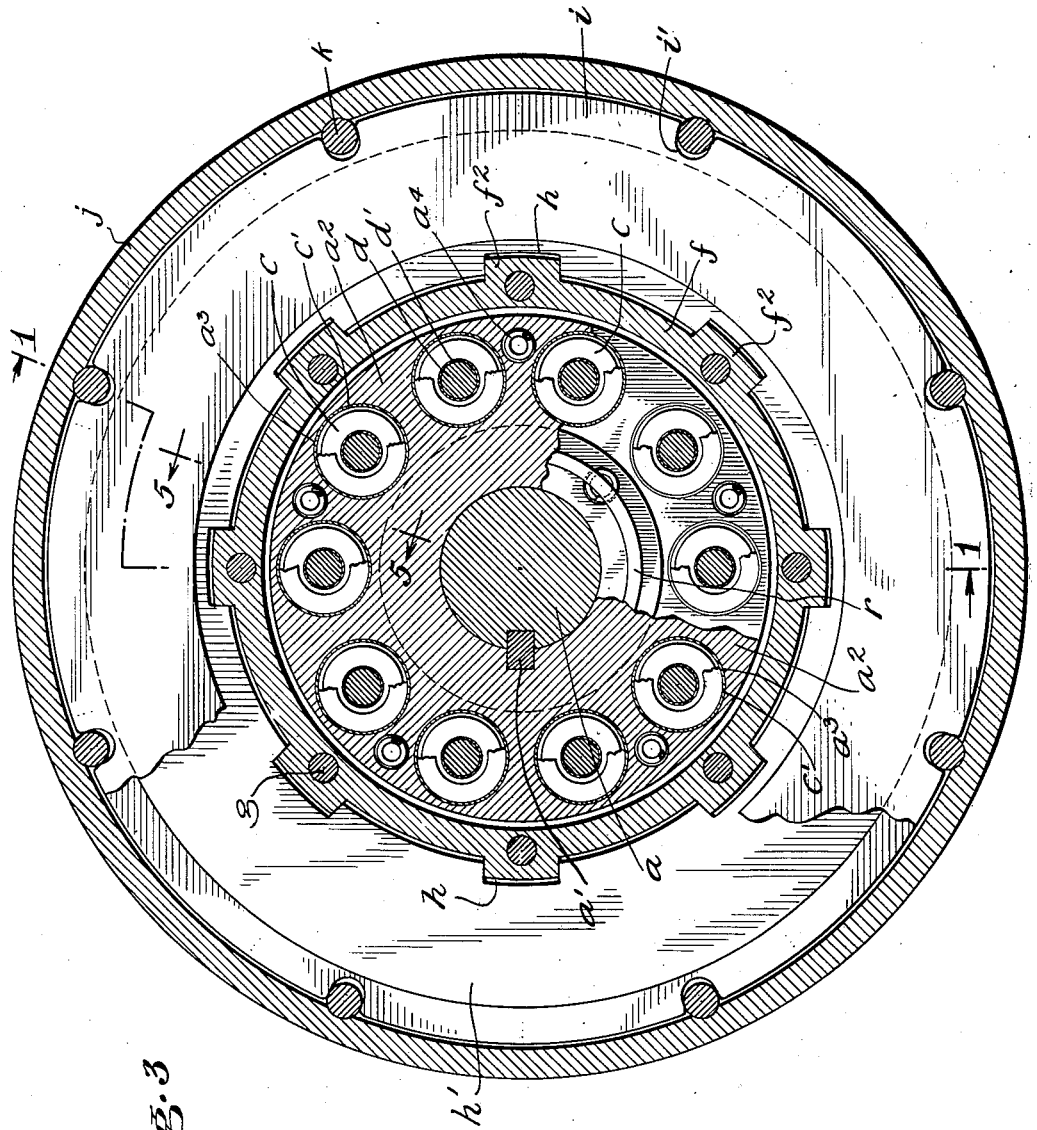
Fig. 3 is a view in transverse section taken on the plane indicated by line 3—3 of Fig. 1 and looking in the direction of the arrows.

As shown in Figure 1, it will be assumed that the driving shaft is $a$ and the driven shaft is $b$ and this may be generally the preferred hook-up because, as will appear later, less mass will be rotated by the shaft $a$ when the clutch is idle. To the shaft $a$ is keyed or otherwise secured as at $a'$ a drum $a^2$ near the circumference of which are provided an annular series of circular recesses $a^3$ of any desired number. Within these recesses are disposed yielding drive elements of any desired form, herein illustrated as concentric, nested, helical springs $c$ the sides of the faces of the coils which are, respectively, reversely tapered. Each of these springs may rest within a metal sleeve $c'$ nicely fitting within the recess $a^3$, and be centered by through-bolt $d$ extending through a metal sleeve $d'$ within the bore of the helical springs. Concentric with the drum $a^2$ and encircling it with free clearance is a channel shaped housing which may be made up of two parts, one consisting of a circular disc $e$ and the other consisting of a circular, L-shaped disc $f$ complementary in form to the plate $e$ and bolted to its face by bolts $d$ so as to constitute a channel shaped housing encircling the drum $a^2$. The bolts $d$ pass through the plate $e$ and are secured in the circular flange $f'$ of the disc $f$. The plate $e$ extends beyond the periphery of the disc $f$ and comprises a follower plate for the clutch discs, as will appear hereinafter. From the description given, it will be evident that rotational forces from the shaft $a$ will be transmitted by the drum $a^2$ through the series of springs $c$ and bolts $d$ to the disc $f$ and plate $e$, so as to cause rotation thereof. Normally, the drum $a^2$ is held positioned within the channeled housing formed by the disc $f$ and the plate $e$ by an annular series of opposed springs $a^4$ seated within recesses on the opposite faces of the drum $a^2$ and engaging the proximate faces of the discs $e$ and $f$, respectively. These springs are of such tension that it may be overcome readily whenever the follower plate $e$ is to be moved axially incidental to engagement or release of the friction discs. An annular series of bolts $g$ pass through the disc $f$ and plate $e$. The periphery of the disc $f$ is formed with radial ribs $f^2$ of any desired form. These ribs engage loosely corresponding slots $h$ on the inner circumference of each of several friction rings $h'$, whereby rotation of the disc $f$ causes rotation of the several rings $h'$. Interposed between the several rings $h'$ are several cooperating friction rings or plates $i$. The follower plate $e$ bears against the last friction ring at one end of the series, while the last friction ring at the other end of the series seats on the inner wall of the two part housing $j$, hereinafter described more fully. Each of the friction rings $i$ is provided on its circumference with notches $i'$ of any desired number through which extend, respectively, a plurality of bolts $k$ which are secured in the housing $j$. When pressure is applied to the follower plate $e$ by the operating mechanism to be described later, the several friction plates $h'$, $i$ are forced into intimate engagement so that rotation of the shaft $a$, being impressed on the several friction plates $h'$, in the manner hereinbefore described, causes rotation of the several friction plates $i$ and, through their engagement with the bolts $k$, corresponding rotation of the housing $j$.

The clutch operating mechanism will now be described. For the most part, it may be said that this mechanism is housed within the other section $j'$ of the two part housing, the two sections $j$, $j'$ being bolted together rigidly by the bolts $k$ which pass through an annular flange $k'$ on the section $j'$ and are screwed into the end wall of the section $j$.

In juxtaposition to the follower plate $e$ is mounted a circular presser plate $l$ on the circumference of which is a series of notches $e'$ to receive the bolts $k$, respectively. The presser plate is advanced or retracted by spring pressure applied thereto through toggle mechanism secured thereto at such points as will insure uniform application of power. As shown in Figures 1 and 4, it is preferred to employ four such toggle mechanisms around the presser plate and spaced 90° apart. It will be sufficient for an understanding of the invention to describe one such toggle mechanism. A link $l^2$ is shown as pivoted at $l^3$ to lugs $l^4$ on the face of the plate. This link is pivoted at its other end on a pin $m$ carried with a spring follower $m'$ on which is seated a coil spring $m^2$. The other link $n$ of the toggle mechanism is also pivoted on the pin $m$, its other end being pivoted as at $n'$ on a carrier ring $n^2$ mounted within a flange $o$ formed on the inner face of the end plate $j^2$ of the housing which end plate is adjustable axially for a purpose to be described. Since the pivot $n'$ is always relatively fixed when the toggle links $n$, $l^2$ are straightened, pressure is applied through the link $l^2$ to the presser plate $l$. Reversely, when the pin $m$ is retracted to break the toggle, the presser plate $l$ is retracted. The pressure which is applied to the presser plate $l$ is transmitted through the spring $m^2$ which is seated at its free end on a tubular link $p$ pivoted on a pin $p'$. The pin $p'$, in addition, is connected to the spring follower $m'$ by means of a stud $m^3$ which extends through the tubular link $p$ and is threaded at one end to the follower $m'$ and has a lost motion pivotal connection at $m^4$ with the pin $p'$. The pin $p'$ is secured in lugs $q$ carried on a sliding sleeve $q'$ which extends through the end plate $j^2$ of the housing and is engaged by a pivoted operating fork $q^2$, whereby the sleeve may be moved axially in either direction. The section $j'$ of the housing is split to permit assembly and disassembly and the parts secured together by tangential bolts $j^3$. The outer circular wall of this section $j'$ is carried on a spider terminating in a split hub $j^4$ which is keyed on to the shaft $b$, the two parts of the hub $j^4$ being bolted together by means of the bolts $j^5$. Accordingly, it will be seen that rotation of the section $j'$ of the housing causes rotation of the shaft $b$. The operating sleeve $q'$ is formed to have a sliding fit on the hub $j^4$ so that it is guided in its movements in and out. When the sleeve $q'$ is moved inwardly, as viewed in Figure 1, the distance between each pin $p'$ and the toggle pin $m$ is shortened so that pressure is transmitted yieldingly through the spring $m^2$ to the toggle mechanism. Under the influence of this spring pressure, the presser plate $l$ is forced to the right to engage the friction rings $h'$, $i$ for transmission of power. The three centers $l^3$, $m$ and $n'$ of each toggle connection are so related that the toggle pin $m$ cannot move into line with the pins $l^3$ and $n'$ and it necessarily follows that at no time is the presser plate $l$ subject to positive urging, but always only to spring urging by the spring $m^2$. When the operating sleeve $q'$ is retracted or moved to the left, as viewed in Figure 1, the pin $p'$ picks up the stud $m^3$, and positively retracts the toggle pin $m$ so as to relieve the presser plate $l$ from the pressure of the spring $m^2$ and permit disengagement of the friction rings $h'$, $i$.

The pressure exerted on the presser plate $l$ can be adjusted in the first instance and from time to time, as may be necessary to compensate for variable factors, by moving the end plate $j^2$ to the right or left, as viewed in Figure 1, thereby moving the pin $n'$ for each toggle mechanism towards or away from the other end wall of the housing. Any such movement will obviously affect the relative disposition of the toggle mechanism to the parts to be operated upon. The end plate $j^2$, as previously stated, is threaded to the housing section $j'$, as indicated at $j^6$. On the circumference of the plate $j^2$ is formed a rack $j^7$ the teeth of which are engaged constantly by a pinion $j^8$ journalled rotatively in the end wall of the section $j'$. This pinion is held against rotation by means of a spring pressed detent $j^9$ the stem of which may be engaged by a suitable tool to permit its retraction when the pinion is to be rotated. When the detent is retracted, the pinion may be rotated by any suitable means such as a special tool inserted into the open end $j^{10}$ of its hub, the recess being irregular in cross-section to receive the tool, as will be understood. By rotating the pinion, the entire end plate $j^2$ is screwed in or out of the section $j'$ thereby advancing or retracting the plate axially with the effect before noted.

The construction described provides a clutch which is wholly enclosed within a housing. To insure adequate lubrication for all of the parts, a spring pressed oil ring $r^0$ is mounted within a circular recess formed in the face of the drum $a^2$ and adapted to be urged against the inner wall of the housing near the shaft $a$. At the other end of the housing the end plate $j^2$ has a packing $j^{12}$ which bears against the outer face of the sleeve $q'$ and retains the lubricant while permitting free movement of the sleeve.

From the description given, it is evident that there is no positive connection between the driving member and the driven member. For this reason, in assembling the clutch the shafts $a$ and $b$ need not be aligned. The parts adjust themselves to any misalignment completely without interference to efficient operation. The driving forces are transmitted through the yielding springs $c$ and such transmission is not changed by reason of misalignment or displacement. The presser plate $l$ is always moved uniformly along a truly axial path and exerts its power on the friction members at right angles thereto, regardless of misalignment or displacement. The application of power to the friction members is never accomplished by positive actuation, but always through the intermediary of the springs $m^2$. If the load applied through the friction members at any instant exceeds the holding power produced in them by the pressure of the springs $m^2$ at that instant, they will slip relatively, thereby relieving the clutch of damaging results. The maximum holding force desired for a particular installation may be adjusted by varying the position of the end plate $j^2$ so that on any particular job the over load point at which the friction elements will slip may be nicely gauged in advance. In the same way, undue shocks tending to damage the friction elements or cause undue wear may be relieved automatically because of the yielding nature of the force applying mechanism. The torque and braking reactions are cushioned by means of the spring transmission elements $c$ so that all of the parts of the clutch are correspondingly relieved of abrupt changes in load. Relative axial movements between the shafts $a$ and $b$ are afforded in the improved clutch because of its characteristics and end play in the shafts will have no effect on the efficient operation of the clutch itself. This is of special importance where the driving shaft is carried with the armature of an electric motor. All of the parts are compactly housed within a single casing occupying much less aggregate space than has heretofore been the case and the operating parts with the housing constitute a virtual flywheel which may be helpful in some installations. The ready removal of the housing section $j'$ insures quick and easy access to the interior without requiring the entire job to be taken down for inspection, replacement or repair. Protection of the friction elements against undue stresses, as described, makes their replacement necessary only at infrequent intervals. The presence of a lubricant for all of the operating parts minimizes the wear and attention required. The manner of applying the holding forces to the friction plates insures even distribution thereof over their entire superficial areas so that tension will be exerted uniformly when the clutch is engaged. Conversely, slippage of the friction elements is accomplished in a gradual and even manner so that the clutch can transmit some power regularly, even when slipping to a desired degree.

Changes of a mechanical nature will suggest themselves to those skilled in the art, but such changes are to be deemed within the scope of the invention, in so far as they are covered by the claims annexed hereto.

What I claim is:

1. In combination with driving and driven members, friction clutch elements operatively connecting said members, a pair of nested helical springs embodied in one of said clutch elements to compensate for any misalignment and permit yieldingly free axial displacement of said members and means to transmit force from one clutch element to another through the springs.

2. In combination with driving and driven members, a friction clutch operatively connecting said members, a housing mounted upon one of said members and enclosing all of the operating parts of said clutch while free of the other of said members to permit free relative movement between said members, an oil seal within the free end of said housing, and means to urge the seal in constant engagement with the housing while permitting relative movement therebetween.

3. In combination with driving and driven members, a friction clutch operatively connecting said members and comprising a yielding, power transmitting element, cooperating friction elements, a housing enclosing the clutch and toggle mechanism anchored to the housing and having their free ends movable to exert thrust on said friction elements to bring them into operative engagement, spring operating means for said toggle mechanism including springs movable into and out of radial position with respect to said first named members, and means operatively connected to the toggle mechanism for positively retracting said mechanism to permit release of the friction elements.

4. In combination with driving and driven members, a friction clutch operatively connecting said members and including a yielding, power transmitting element, cooperating friction elements, a housing enclosing the clutch and toggle mechanism anchored to the housing and having their free ends movable to exert thrust on said friction elements to bring them into operative engagement, spring operating means for said toggle mechanism including springs movable into and out of radial position with respect to said first named members, and means operatively connected to the toggle mechanism for positively retracting said mechanism to permit release of the friction elements, and yielding elements cooperating with said retracting means to relieve the pressure on said friction elements.

5. In combination with driving and driven members, friction clutch elements operatively connecting said members, a pair of nested helical springs, the coils of which have cooperating reversely tapered sides embodied in one of said clutch elements to compensate for any misalignment and permit yieldingly free axial displacement of said members, and means to transmit force from one clutch element to another through the springs.

6. In combination with driving and driven members, friction clutch elements operatively connecting said members, one of said members formed of two relatively movable parts, a pair of nested helical springs mounted in one of the parts and a bolt carried by the other part and passing through the springs, the cooperating sides of the springs being reversely tapered, whereby the transmission of force between the parts causes a wedging of the coils and elongation of the springs.

This specification signed this 23d day of November, A. D. 1927.

AUGUST SUNDH.